3,200,967
AUTOMATIC TRANSFER DEVICE
Giuseppe Delzanno, Turin, Italy, assignor to Fiat Società
per Azioni, Turin, Italy
Filed Nov. 26, 1963, Ser. No. 326,122
Claims priority, application Italy, Nov. 27, 1962,
23,561/62
6 Claims. (Cl. 214—1)

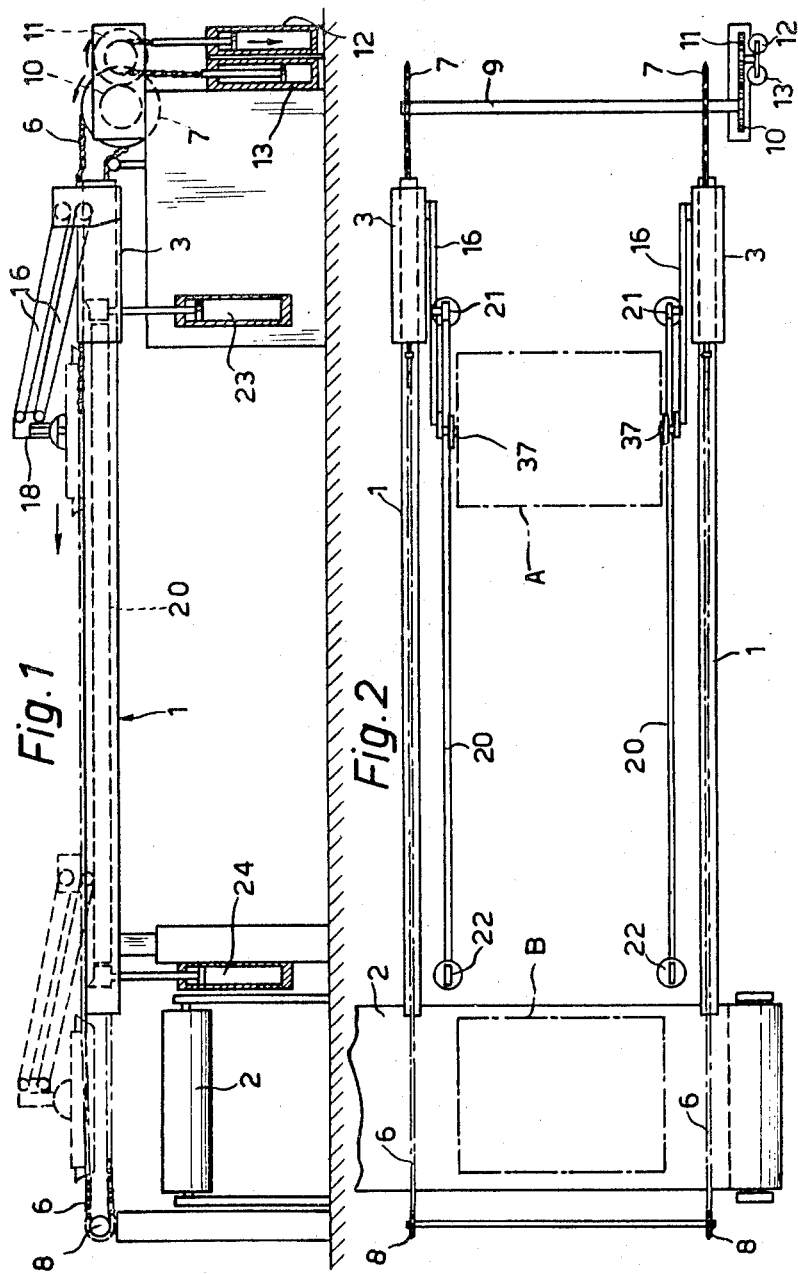

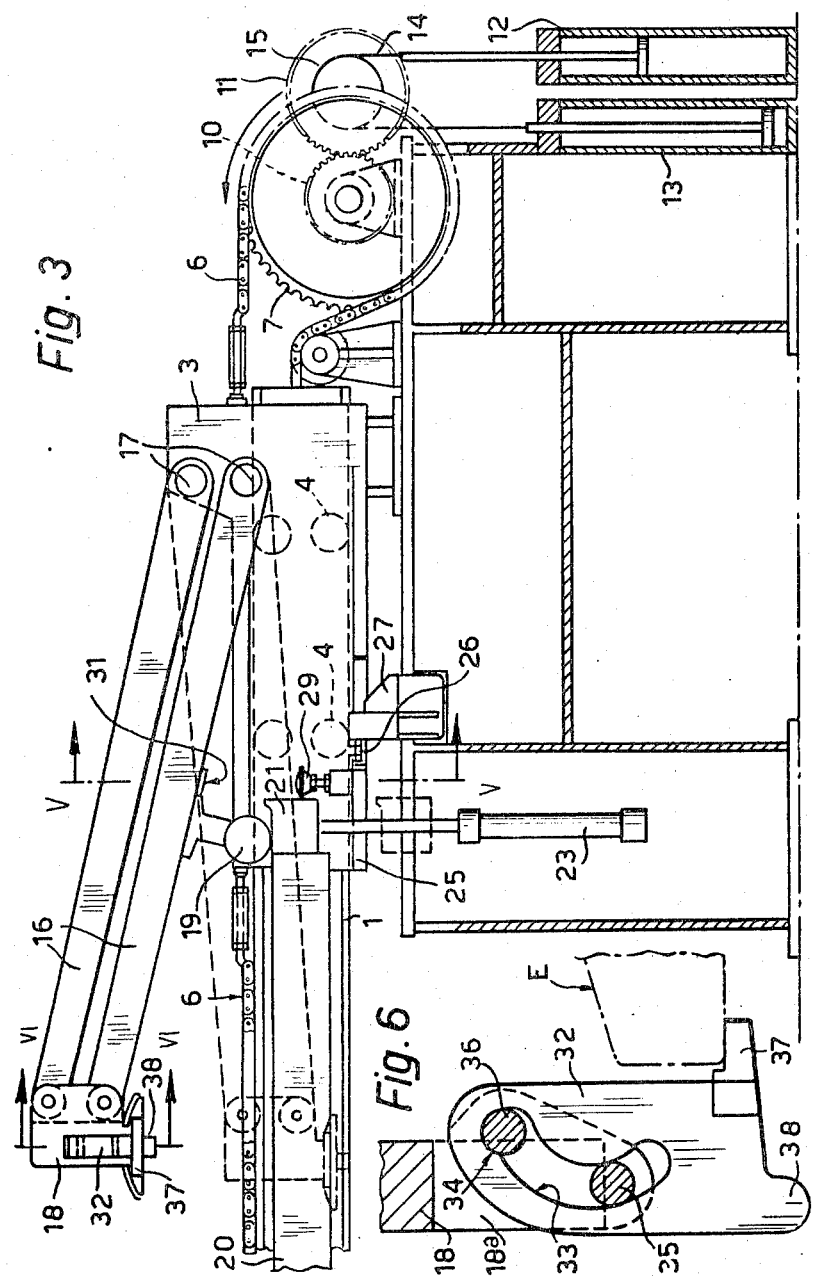

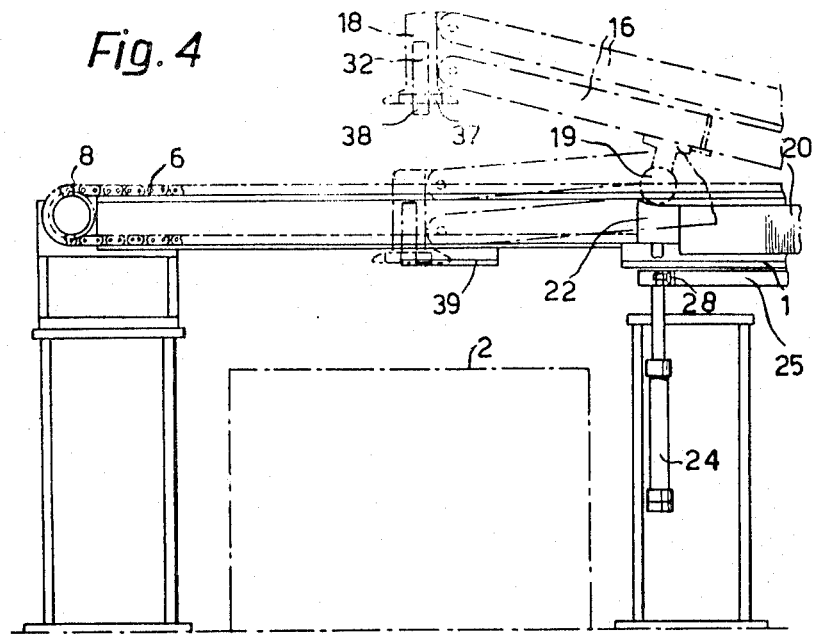
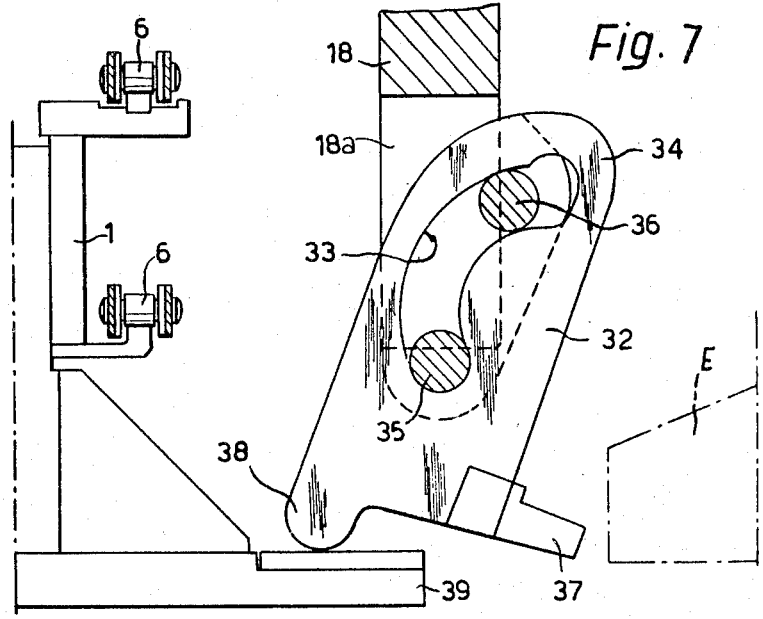

This invention relates to a device for automatically transferring parts between two consecutive assembly lines. The device is suitable more particularly for use when the assembly line ahead is of a type effecting transfer by reciprocating feed members, the parts to be transferred being clumsy and irregular in shape.

The device according to this invention comprises a pair of trucks reciprocable over guide rails, each carrying a pair of parallelogram swing arms provided with means for supporting and releasing the part to be transferred, said arms cooperating with guide rails and movable lugs arranged at the ends of the guide rails, which effect oscillation of the arms alternately in an upward and downward direction in order to seize the part at the start of the transfer motion and release it at the end of said motion.

The invention shall be described with reference to the accompanying drawings which show diagrammatically by way of a non-limiting example an embodiment thereof.

FIGURE 1 is a diagrammatical elevational view of the device,

FIGURE 2 is a plan view,

FIGURES 3 and 4 show the two ends of the device on an enlarged scale,

FIGURES 5 and 6 are part sectional views on lines V—V and VI—VI of FIGURE 3, and FIGURE 7 is a sectional view similar to FIGURE 6 at another operational stage.

Figure 5:
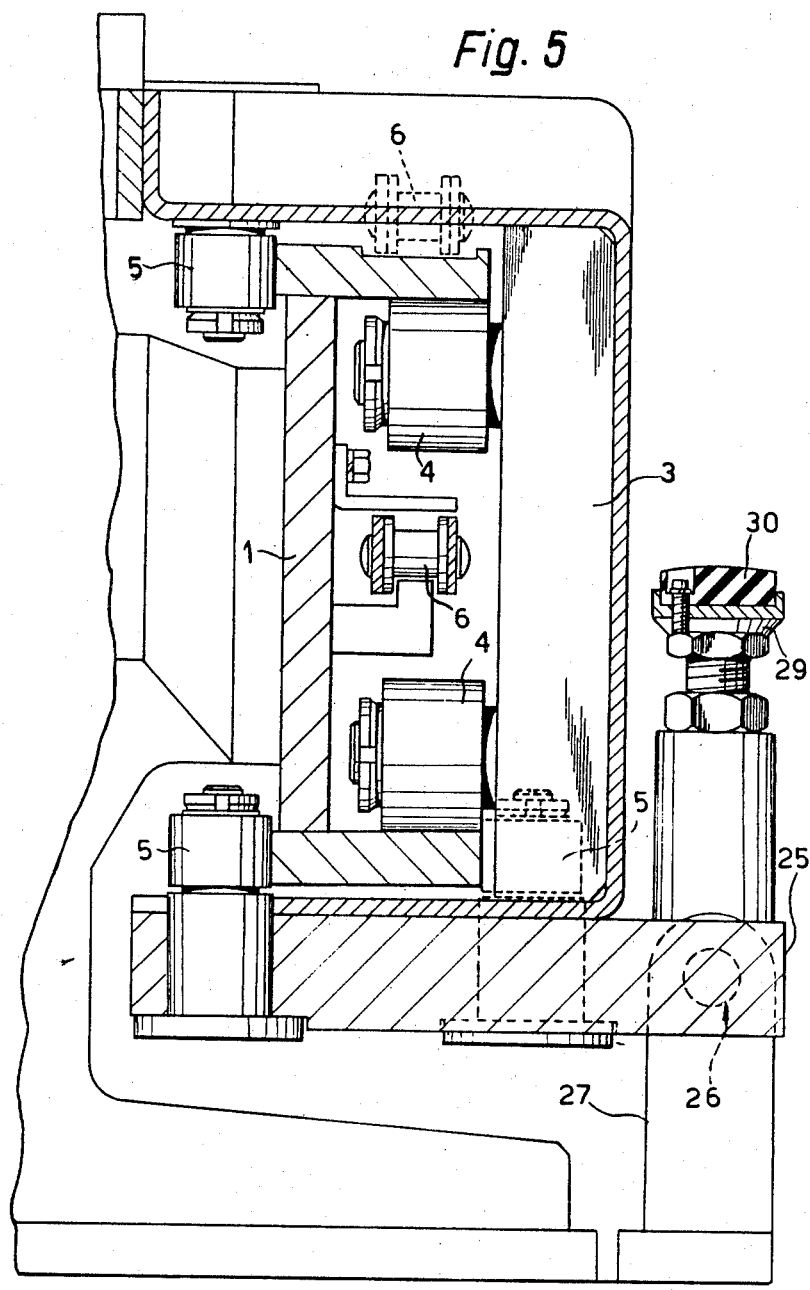

Referring to FIGURES 1 and 2, two parallel rectilinear guide rails 1 are transversely arranged with respect to two assembly lines to be interconnected, A denoting the last station of the first line and B the first station of the second line which is in the form of a band conveyor 2.

Two trucks 3 are movable over the guide rails 1, said trucks being of C-shape, FIGURE 5, and being provided with rollers arranged with a horizontal axis 4 and rollers arranged with a vertical axis 5. The ends of a sprocket chain 6 are anchored to each truck. The sprockets travel over sprocket wheels 7, 8 arranged at the ends of the guide rails 1. The top side of the sprocket carries the means for fastening to its respective truck and travels over the guide rails 1, the bottom side being guided within said guide rails.

The driven sprocket wheels 7 are connected to a shaft 9, which is rotated in either direction through a speed increasing pair of toothed wheels 10, 11 from a pair of hydraulic jacks 12, 13, the rods of which act through a chain or Bowden cable 14 on a toothed wheel 15 fast with said toothed wheel 11.

The operative strokes of the hydraulic jacks 12, 13 are both downwardly directed, the jack 12 effecting movement of the parts in the direction denoted by the arrow in FIGURE 3, which results in movement of the trucks 3 from the inlet station A of the first line to the outlet station B of the second assembly line. This movement transfers the parts between the stations A and B.

The hydraulic jack 13 effects the reversed idle return movement of the trucks from station B to station A.

The trucks each carry a pair of arms 16 pivoted at 17, the other ends of which are articulated to a block 18, the whole forming an articulated parallelogram. The arm pairs 16 each carry a bottom roller 19, said rollers 19 cooperating with a pair of guide rails 20 arranged within and extending parallel with the guide rails 1. Movable elevator lugs 21, 22 are arranged at the opposite ends of the guide rails 20 for movement towards stations A, B, respectively. The lugs 21 are carried by the rods of hydraulic jacks 23, the lugs 22 being similarly carried by the rods of hydraulic jacks 24. The lugs are arranged accurately at the end positions reached by the rollers 19 on the arms, the vertical upward and downward movement of the rods in the jacks 23, 24 carrying the lugs 21, 22, respectively, effecting movement of the rollers 19 from the upper to the lower level of the stationary guide rail 20.

The trucks 3 each carry an inwardly directed lower extension 25 adapted to cooperate with a spring push rod 26 carried by a support 27 fast with the bedplate near station A and with a push rod 28 arranged near station B. Moreover, the trucks carry an adjustable vertical pillar 29 provided with a top resilient lug 30 adapted to cooperate with a similar lug 31 on the arms 16 when the latter are in their lowered position to support the arms.

A notch 18a in the end block 18 on the swing arms 16 receives a movable block 32 acting as a hook for supporting and releasing the part E to be transferred from station A to station B.

The blocks 32 are each formed with a curved slot 33 (FIGS. 6 and 7) formed with a top recess 34. The slot 33 and recess 34 are guided with respect to two pivots 35, 36 on the block 18. The block 32 is moreover formed with a lateral projection 37 acting as a supporting hook for the part E to be transferred and with a bottom projection 38 adapted to cooperate with a stationary part 39 at the ends of the guide rails 1 towards the inlet station B.

Assuming the trucks to be initially at standstill near station A in the position shown in FIGURES 1 and 3, the arms being lifted, the device is ready to receive a part to be transferred from the last station A of the first assembly line to the first station B on the second assembly line. The part is placed on the end hooks on the arms 16, the hydraulic jack 12 effecting the forward movement of the trucks 3 along the guide rails 1, the arms 16 being maintained in their lifted position and the rollers 19 rolling along the top profile on the guide rails 20. The end of the forward movement of the trucks is brought about by abutment of the projections 25 and push rods 28. The rollers 19 on the arms 16 are then on the lugs 22. The latter are lowered by the hydraulic jacks 24, so that the arms 16 oscillate downwardly lowering the just transferred part E onto the underlying conveyor 2. The transferred part hangs on the hooks 37 until the lower projections 38 on the movable lugs 32 contact the stationary abutments 39. Abutment results in release of the blocks 32 with respect to the pivot 36 and oscillation of the blocks 32 from the position shown in FIG. 6 to the position shown in FIGURE 7, whereby the hooks 37 are withdrawn and the transferred part E is released and is free to fall on the band conveyor 2.

The arms 16 are now in their lower position denoted by a dash line in FIGURE 4 and rest on the pillars 29. The idle return stroke of the trucks 3 is started by the hydraulic jack 13. At the end of said stroke the rollers 19 having travelled along the lower profile of the guide rail 20 are superposed on the lugs 21 which are in turn in a lowered position as shown by dash lines in FIGURE 3. The jacks 23 now lift the lugs 21, whereby the arms are oscillated upwardly and arrange the device for the next operational cycle.

Operation of the hydraulic jacks 12, 13, 23, 24 is of course synchronous with the movement of the two assembly lines.

The blocks 32 carrying the supporting hooks 37 are automatically restored on release of contact of their lower projection 38 and stationary portions 39.

What I claim is:

1. An assembly line conveyor comprising a first guide rail means, a truck means comprising a body reciprocably movable along said side rail means, movement of said truck means being effected by a pair of hydraulic jacks, said jacks having plunger rods operatively connected to said truck means, each rod alternately imparting movement to said truck means in only one direction along said rail means, movement imparted by one rod being oppositely directed to that imparted by the other, said truck means comprising rollers for riding on said rail means, said truck means comprising a pair of elongated parallel arms each pivoted at one end to the body of said truck means and having a gripping device pivotally attached to the other ends, one of said arms having a roller between its ends, said roller riding on a second guide rail means which comprises upper and lower tracks, a hydraulic jack located at each end of said second rail means and comprising a lug plunger rod movable transversely of the length of said second rail means and an elevator lug on the end of the rod, each elevator lug being aligned to form a continuous surface with said upper and lower tracks respectively, of said second rail means when each lug plunger rod is at the upper or lower limit, respectively, of its stroke, said roller on said arm riding on the upper and lower tracks respectively, of said second rail means during respective reciprocal movements of said truck and leaving said second rail and coming to rest on respective ones of said elevator lugs when said truck means is at the opposite limits of its reciprocal movements, all the aforementioned hydraulic jacks being synchronously correlated one with the other so that when said truck means reaches one limit of its reciprocal movement a one of said elevator lugs is in position to receive said arm roller thereon as said roller leaves either the upper or lower track of said second rail means, said one elevator lug then being moved by its associated jack to a position in alignment with the other track of said second rail, whereby when said truck means performs its reciprocal movement away from said one limit the arm roller will ride on said other track of said second rail.

2. The conveyor of claim 1 wherein said gripping device comprises a body pivotally attached to each of said arms, said body having two pins whose axes are in different planes, rigidly connected thereto, a gripping element having a curved slot in one portion thereof, said slot having an indented portion at one end thereof, said pins extending through said slot, one of said pins being engagable in said indented portion of said slot whereby said element can be locked in an article holding position, said slot being of such extent as to permit said gripping element to pivot about both pins, said gripping element comprising a hook portion and an abutment protrusion, an abutment plate located so that when said arm roller is lowered from said top track to said bottom track of said second rail means said abutment portion on said gripping element strikes said plate and is pivoted about said pins so that said hook portion moves to a position releasing any item held thereon, said gripping element automatically resuming its article holding position upon termination of contact between said abutment protrusion and plate.

3. The conveyor of claim 1 wherein the plunger rods effecting reciprocal movement of said truck means are each connected to one end of a flexible element which drivingly engages the circumference of a rotary member, said rotary member being drivingly connected to a sprocket wheel which drives a sprocket chain, said chain being secured to said truck means said truck plunger rods performing a reciprocating motion which is transferred to said truck means through the aforementioned elements located between said plunger rods and said truck means.

4. The conveyor of claim 3 wherein said rotary member is connected to said sprocket wheel through a speed multiplying gear.

5. The conveyor of claim 1 wherein said first guide rail means comprise stop elements at each end, said stop elements limiting the linear travel of said truck means in either direction of said first rail means.

6. The conveyor of claim 1 wherein said truck means comprises a support having a resilient body on one surface thereof and said arms comprise an abutting surface, said abutting surface resting on said resilient body when said arm roller is riding on said lower track of said second rail means.

References Cited by the Examiner

UNITED STATES PATENTS 3,123,197  3/64  Pianowski _____ 198—19

SAMUEL F. COLEMAN, *Primary Examiner.*

WILLIAM B. LA BORDE, *Examiner.*